UNITED STATES PATENT OFFICE.

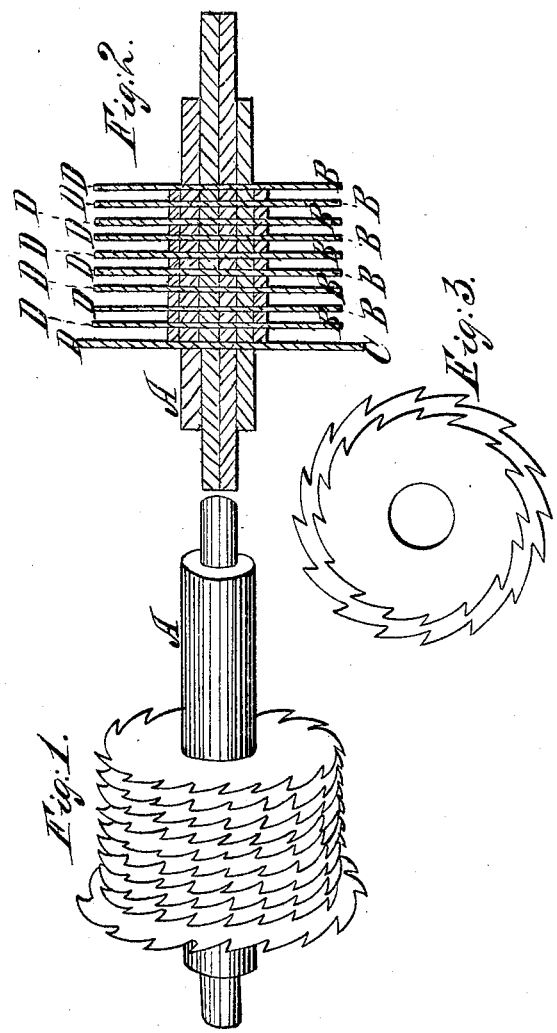

JONATHAN MORGAN, OF PORTLAND, MAINE.

ARRANGEMENT OF CIRCULAR SAWS FOR PREPARING BLOCKS FOR MATCHES.

Specification of Letters Patent No. 1,203, dated June 27, 1839.

*To all whom it may concern:*

Be it known that I, JONATHAN MORGAN, of Portland, in the county of Cumberland and State of Maine, have invented a new and useful improvement upon the gang of circular saws in making or sawing blocks for friction-matches by adding to the gang of nine saws, more or less, as heretofore used, another saw at one end of the gang, about one inch larger in diameter, more or less, than the gang, which additional saw is used as a trimmer, to trim all the blocks to an exact size as they are sawed; and I do hereby declare the following specifications to be a full and exact description thereof.

This invention consists in adding one more circular saw to the gang, whatever number may compose the gang, about one inch larger, in diameter more or less than the gang, which additional saw is called the trimmer. The design and use of this additional saw is to trim down the blocks, when the joists, or bolts, from which the blocks are sawed, are a little too large, to just the size of one and three-eighths of an inch square or any other necessary or convenient size, that size making a perfect block, that is, a block sawed into one hundred slits, or matches, of a proper size, and this trimming is done, when the blocks are sawed into slits. In bolting out the stuff, into bolts or joists, it is very difficult to get the stuff exactly 1¾ inches square or to any particular size. This inequality has to be remedied by gaging and jointing the stuff, before slitting it, into matches, which is a very considerable labor and expense. Doing it in this way by the addition of another and larger saw, as above stated, answers all the purpose of gaging and jointing and wastes no more stock. This trimming saw trims one side, when the gang runs the first time through the block, making it into ten slabs. Then the block is turned one quarter over, and the gang run through the block again, making those ten slabs into one hundred slits, or matches, and, at the same time, the side of the block is trimmed, by the trimming saw, leaving the block, when finished, exactly 1¾ inches square or all of a bigness whatever may be the size. These blocks are usually sawed two inches deep, making the matches two inches long and the butt end of the block is usually left from two to four eighths of an inch long. This method of sawing is a great neatness in manufacturing, as well as saving of labor, in manufacturing. This trimming saw should be so much larger, in diameter, than the gang, as to cut far enough ahead of the gang to trim the butt of the blocks, as well as the slits.

What I claim as my own invention, in and by these specifications, and wish to secure, by Letters Patent to be issued thereon, is—

The addition of one more saw to the gang, at one end, of a diameter so much larger than the gang as to trim the whole length of the block, while the gang is sawing the slits, and I claim nothing else, but this addition, that is its application and use as above stated.

In testimony that the above specifications are full and exact description and explanation of my said improvement and the particular part of the said machine, which I claim as my own invention and application, I have hereunto set my hand this twenty first day of December, in the year of our Lord one thousand eight hundred and thirty eight, at Portland, Maine.

JONATHAN MORGAN. [L. S.]

Witnesses:
FRANCIS O. J. SMITH,
EZRA CARTER, Jr.